United States Patent
Long et al.

[19]

[11] Patent Number: 5,911,244
[45] Date of Patent: Jun. 15, 1999

[54] PRESSURE CONTROL VALVE

[75] Inventors: Charles Francis Long, Pittsboro; Martin Robert Dadel, Indianapolis; Jeffrey Jay Cole, Plainfield, all of Ind.

[73] Assignee: General Motors Corporation, Detroit, Mich.

[21] Appl. No.: 09/135,757

[22] Filed: Aug. 18, 1998

[51] Int. Cl.$^6$ ................................................. F15B 13/043
[52] U.S. Cl. ...................................... 137/625.64; 91/433
[58] Field of Search ........................ 137/625.64; 91/433

[56] References Cited

U.S. PATENT DOCUMENTS

| | | | |
|---|---|---|---|
| 4,617,968 | 10/1986 | Hendrixon | 137/625.64 |
| 5,492,028 | 2/1996 | Raszkowski | 74/335 |
| 5,496,231 | 3/1996 | Eaton | 477/126 |
| 5,564,543 | 10/1996 | Wilson | 192/85 R |
| 5,601,506 | 2/1997 | Long et al. | 475/120 |
| 5,616,093 | 4/1997 | Long et al. | 475/120 |
| 5,643,125 | 7/1997 | Long et al. | 475/127 |
| 5,669,473 | 9/1997 | Long et al. | 192/3.3 |
| 5,685,408 | 11/1997 | Long | 192/3.58 |
| 5,738,608 | 4/1998 | Long | 477/130 |

*Primary Examiner*—Gerald A. Michalsky
*Attorney, Agent, or Firm*—Jeffrey A. Sedlar

[57] ABSTRACT

A pressure control valve system for a friction device has a regulator valve with a plurality of pressure feedback differential areas which are selectively pressurized during the engagement of a friction device to control the apply pressure at one rate during normal operation and at a higher rate during high torque demand operation. A plug valve is disposed adjacent the regulator valve to establish two variable control forces acting on the regulator valve in response to a variable control pressure. The combination of the differential areas and the plug valve permit the regulator valve to establish two distinct pressure gain functions, each of which has a knee or inflection point resulting in two pressure gain ratios.

4 Claims, 3 Drawing Sheets

PRESSURE CONTROL VALVE

TECHNICAL FIELD

This invention relates to hydraulic pressure regulation for the engagement pressure of a friction device.

BACKGROUND OF THE INVENTION

Many modern automatic transmissions use trim valves to control the pressure rise of apply pressure in an oncoming friction device such as a disc clutch or disc brake. The trim valve controls the apply pressure increase from a value sufficient to overcome the piston return springs to full engagement pressure. The maximum full engagement pressure occurs during vehicle operation requiring maximum engine torque and in some instances, maximum engine torque multiplied by the torque ratio of the torque converter which can be as high as 3.0.

The system requires that the pressure be controlled between 0 (zero) and 250 psi. This pressure range, in current transmissions, is generally a straight-line function. With the current range of pressure available from conventional trim valves, this requires a 3 to 1 pressure gain. For example, if the apply pressure is from 10 to 270 psi, the trim pressure is from 3 to 90 psi which is consistent with current valve technology. The trim pressure control at the lower end of the range is very important, since during this portion of the apply function, it is necessary to overcome the piston return springs and initiate friction engagement. If the pressure rise is too rapid, a harsh "shift feel" will occur.

With currently available trim valves, the pressure must be controlled in the range of 3 to 5 psi (9 to 15 psi apply pressure) to accommodate this function. Thus, extremely accurate controls are necessary. This situation is exacerbated by the need to provide the control of apply under a plurality of throttle conditions, including a full throttle maximum condition.

SUMMARY OF THE INVENTION

It is an object of the present invention to provide an improved valve for controlling the engagement pressure rise in a friction device.

In one aspect of the present invention, a pressure control valve has a pair of differential areas that are selectively pressurized to control an apply pressure output from a main pressure source in response to a control pressure operating on the control valve.

In another aspect of the present invention, a variable pressure source is directed to an end area of the control valve to provide a force to which the control pressure is proportional.

In yet another aspect of the present invention, a directional flow valve controls the distribution of pressure to one of the differential areas.

In a further aspect of the present invention, a plug valve is provided to selectively increase the force at the end of the control valve when high torque demand is present.

The present invention is effective to provide two apply pressure functions to a fluid-operated, piston-actuated friction device. The use of the two differential areas can provide a pressure gain rate of 2.2 under normal shift requirements and 3.0 under high torque demand. The additions of the plug valve changes the pressure gain rates by changing each curve to have a knee or inflection point.

With the plug valve and the differential areas, each of the apply pressure functions are defined by curves having at least two distinct increasing rates of pressure. One of the curves provides apply pressure for normal operation of an automatic transmission by establishing the pressure gain ratios of 1.3/2.8 to 1.0. The other curve provides higher apply pressure rates, for a given control pressure, during high torque demand by the operator by establishing pressure gain rates of 2.0/4.1 to 1.0. This is compared to a straight-line function in the prior art which establishes a pressure gain rate of 3.0 to 1.0.

The present invention can be accommodated by many currently available hydraulic control systems and particularly by the hydraulic control system shown in U.S. Pat. Nos. 5,01,506 and 5,616,093, both of which are assigned to the assignee of this application. Those skilled in the art of hydraulic controls will recognize the simple modifications that might be required to import the present invention into these and other controls.

The present invention improves the accuracy in the trim pressure of the friction devices during a ratio interchange and reduce the variation in apply pressure due to external factors such as temperature, engine speed and fluctuations in the control current of the solenoids. This will result in improved shift quality and shift consistency. The end result will be improved customer satisfaction with the "shift feel" in the transmissions incorporating this invention.

DESCRIPTION OF AN EXEMPLARY EMBODIMENT

Figure 1:
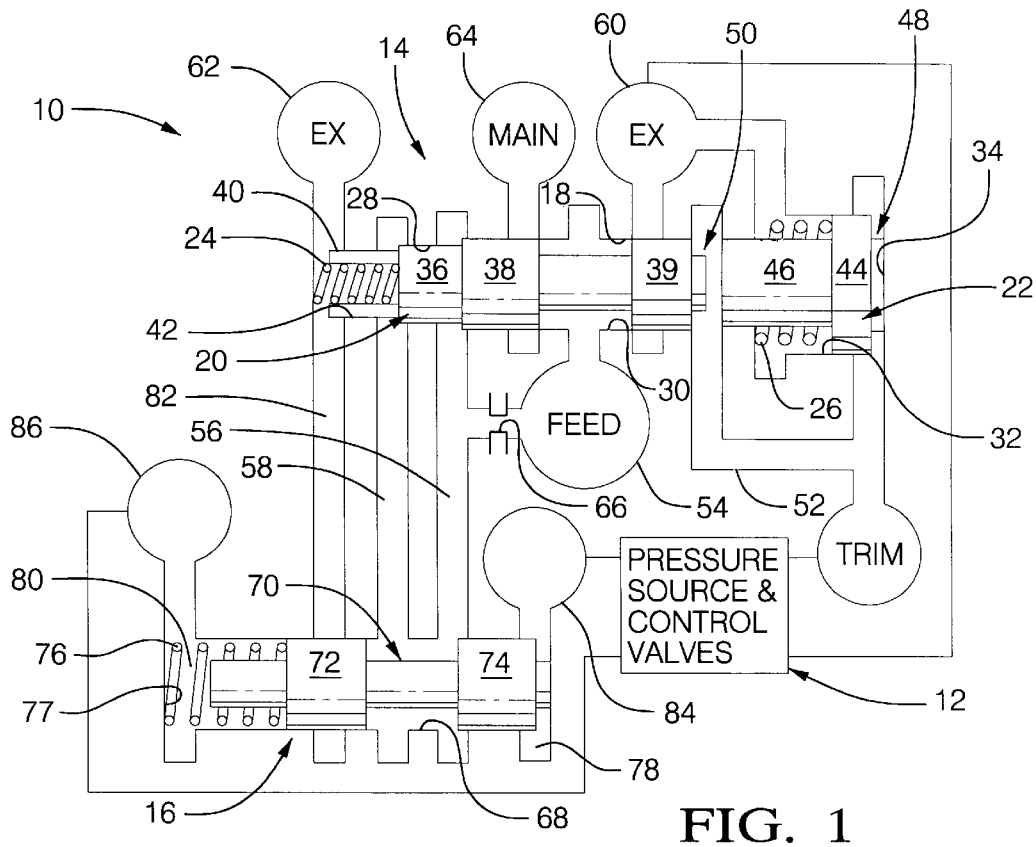
FIG. 1 is a diagrammatic and schematic representation of a portion of a hydraulic control system incorporating the present invention and depicting one stage of operation.

Referring to the drawings, wherein like characters represent the same or corresponding parts throughout the several views, there is seen in FIGS. 1 through 4 a transmission control 10 having a pressure source and control valve mechanism 12, a regulator valve 14 and a bias control valve 16. The pressure source and control valve mechanism 12 can include a pump, shift valves, pressure control valves and other conventional hydraulic control components usually associated with automatic transmissions. One such transmission control is shown in U.S. Pat. No. 5,616,093 issued to Long et al. on Apr. 1, 1997, and assigned to the assignee of this application which is specifically incorporated herein by reference. The operation of these and similar controls is well known to those skilled in the art.

The regulator valve 14 includes a stepped diameter bore 18, a valve spool 20, a plug valve 22 and bias springs 24, 26. The bore 18 has a first diameter bore portion 28, a second diameter bore portion 30 and a third diameter portion 32.

The bore portion 30 is larger than bore portion 28 and bore portion 32 is larger than bore portion 30. The plug valve 22 is slidably disposed in the bore portion 32 and biased rightward therein toward an end 34 of the bore 18 by the spring 26. The valve spool 20 has a first diameter land 36, slidably disposed in bore portion 28; second spaced equal diameter lands 38, 39, slidably disposed in bore portion 30 and a sealing diameter or land 40 which is slidably arranged in a fourth bore portion 42 which is smaller in diameter than bore portion 28. The valve spool 20 is urged toward the plug valve 22 by the bias spring 24.

The plug valve 22 has a first diameter or land 44 and a second diameter or land 46. The first diameter 44 is slidably disposed in the bore portion 32 and cooperates with the end 34 to form a control chamber 48. The diameter 46 is slidably disposed in bore portion 30 and cooperates with the end of land 39 to form a control chamber 50. The control chambers 48 and 50 are both in fluid communication with a trim pressure passage 52. The pressure source and control 12 provide the trim pressure in passage 52 in a well-known manner. Conventional solenoid pressure sources are used. As is known, such sources may be either PWM solenoids or pressure proportional solenoids. The trim pressure is generated in the control portion of the pressure source and control 12 in accordance with conventional input signals such as engine speed, torque demand, and vehicle speed to name a few.

The bore 18 is also in fluid communication with a friction device feed passage 54, a pair of friction device pressure feedback passages 56, 58, exhaust passages 60, 62 and a main pressure passage 64. The passages 60, 62 communicate fluid to a transmission reservoir or lubrication system, not shown, in a conventional manner. The main pressure passage is provided with maximum system pressure from the pressure source 12. The regulator valve 14 is effective to reduce the pressure in passage 64 prior to delivery to passage 54 in accordance with the pressure levels available in passages 52, 56 and 58.

The pressure in passage 58 is derived from the pressure in passage 54 and is separated therefrom by a restriction or orifice 66. The pressure in passage 56 will be substantially equal to the pressure in passage 54 whenever the flow through the orifice 66 is below a predetermined value. This prevents pressure surges in the feedback passages 56, 58. The pressure in passage 58 is either equal to the pressure in passage 56 or exhausted depending on the position of the bias control valve 16.

The bias control valve 16 has a bore 68 in which is slidably disposed a valve spool 70. The valve spool 70 has a pair of spaced lands 72, 74. A bias spring 76 urges the valve spool 70 toward a chamber 78 formed by the land 74 and an end 77 of the bore 68. The spring is situated in a chamber 80 formed by the land 72 and an end 80 of the bore 68. The bore 68 is in fluid communication with the feedback passages 56, 58 and an exhaust passage 82. The chambers 78 and 80 are in fluid communication with respective solenoid control passages 84, 86, which are in fluid communication with the pressure source and control 12. These passages 84, 86 are pressurized selectively by the control 12. The passage 84 is pressurized when a high torque operation is present. This is usually in the first or lowest gear ratio in the transmission when torque converter stall might occur. The passage 86 can be pressurized whenever it is desirable to reduce the pressure gain ratio of the regulator valve 14. As discussed in U.S. Pat. No. 5,616,093, this control can be used to establish the ratios in a power transmission, such as that disclosed in U.S. Pat. No. 4,070,927 issued to Polak and assigned to the assignee of this application.

Figure 2:
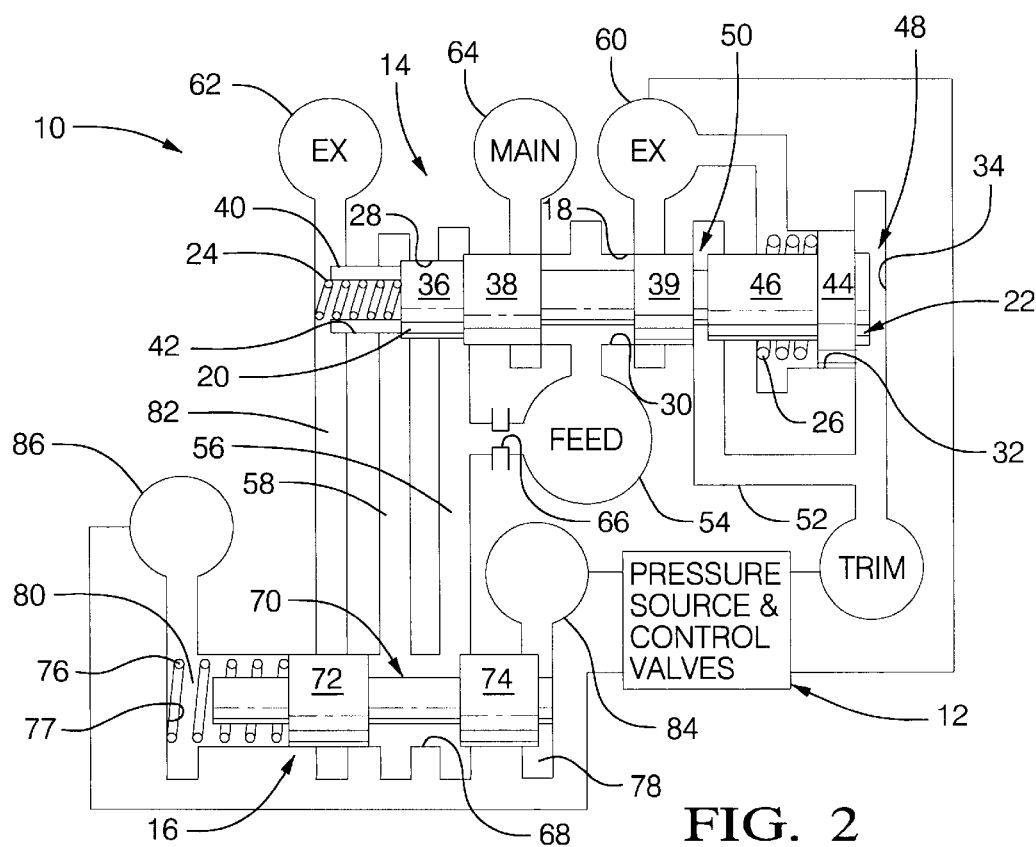
FIG. 2 is a diagrammatic and schematic representation of a portion of a hydraulic control system, similar to FIG. 1, incorporating the present invention and depicting another stage of operation.

With the valve 16 in the spring set position, shown in FIGS. 1 and 2, the feedback passages 56, 58 are in fluid communication between the lands 72, 74. When the passage 84 is pressurized and the passage 86 is exhausted, the valve spool 70 is moved to the pressure set position, shown in FIGS. 3 and 4, such that the feedback passage 58 is in fluid communication with the exhaust passages 82 and 62. Under this condition only the feedback pressure in passage 56 is communicated to the regulator valve 14.

The differential area between land 36 and sealing land 40 is designated A1, the differential area between land 36 and land 38 is designated A2. The area of land 39 is designated A3 and the area of diameter 44 is A4. The fluid pressure in passage 52 is effective on both areas A3 and A4. The fluid pressure in passage 56 is effective on area A2 and the fluid pressure in passage 58 is effective on area A1. As pointed out previously, the bias control valve 16 controls the effective pressure in passage 58 between the apply pressure of the friction device and exhaust pressure.

During normal operation, the control valves will be in the positions shown in FIGS. 1 and 2 depending on the level of pressure in the trim pressure passage 52. In the position shown in FIG. 1, main system pressure in passage 64 is admitted to the feed passage 54 when the trim pressure in passage 52 is sufficient to overcome the spring force in spring 24 and any feedback pressure at areas A1 and A2. This will cause the feed pressure in passage 54 to increase as well as the pressure in feedback passages 56 and 58. When the forces on the valve spool 20 are in balance, the valve spool will return to neutral, such that land 38 essentially closes main passage 64 and land 39 closes exhaust passage 60. This operation is typical of downstream regulator valves, as will be appreciated by those skilled in the art.

Figure 5:
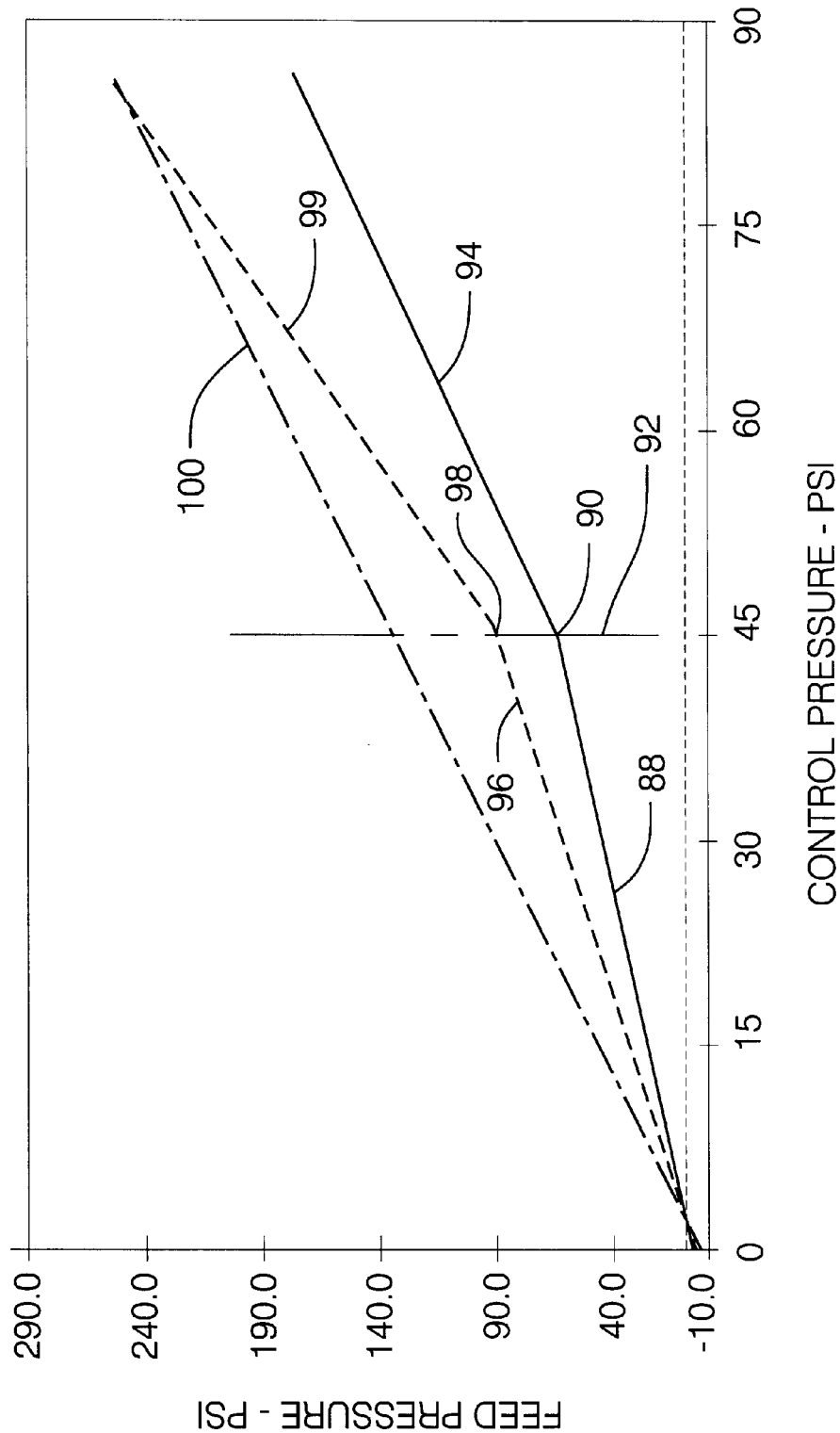
FIG. 5 is graph of SIGNAL PRESSURE versus CLUTCH PRESSURE attainable with the present invention.

The pressure in the feed passage 54 will then vary in response to varying trim pressure in accordance with the curve 88, see FIG. 5, until the trim pressure reaches point 90 at line 92 in FIG. 5. At this point, the area A4 of the plug valve 22 will be sufficiently pressurized to cause the plug valve 22 to engage the valve spool 20. Further pressure rise in the level of trim pressure in passage 52 will cause the feed pressure to increase in accordance with the curve 94. The feed pressure prior to the point 90 is a function of the trim pressure acting on area A3 and the feed pressure acting on areas A1 and A2. In equation form, TP*A3=FP*(A1+A2)+S, where FP is feed pressure and TP is trim pressure and S is the force in spring 24. Since the ratio of A3 to (A1+A2) is 1.3, the feed pressure will rise 1.3 times faster than the trim pressure. Subsequent to the point 90, the feed pressure is a function of trim pressure acting on A4 and feed pressure acting on A1 and A2. In equation form, TP*A4=FP*(A1+A2)+S. The ratio of A4 to (A1+A2) is 2.8 resulting in the feed pressure rising 2.8 times faster than trim pressure.

Figure 3:
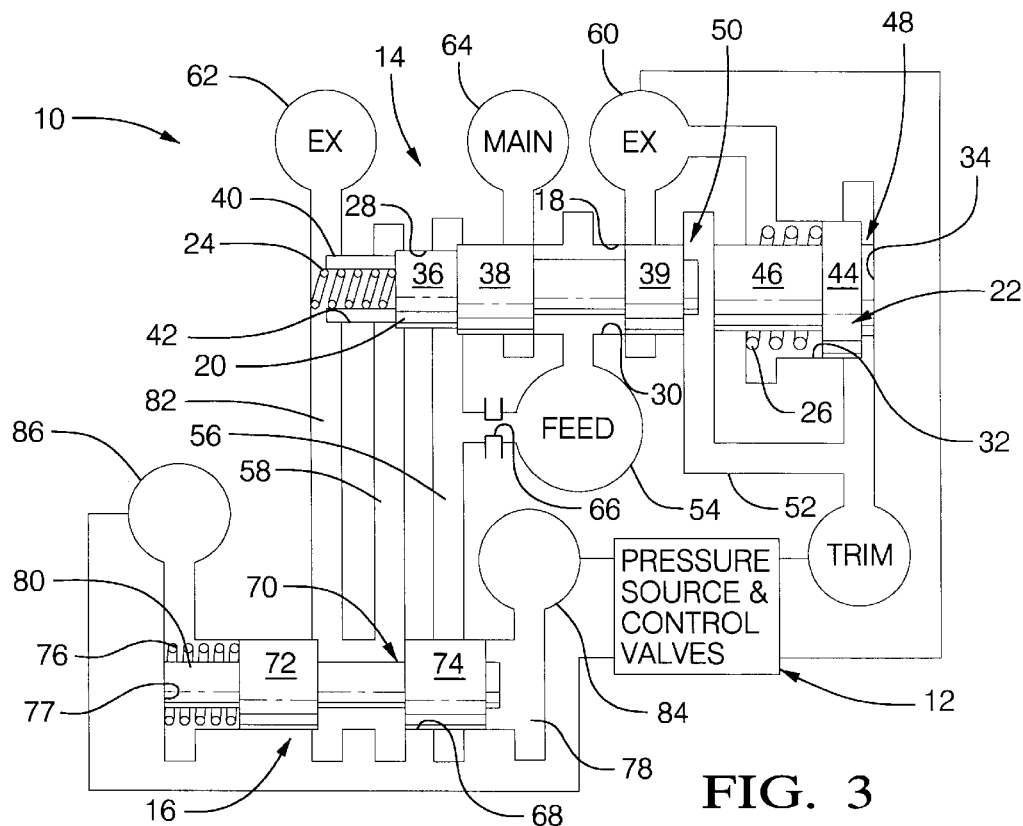
FIG. 3 is a diagrammatic and schematic representation of a portion of a hydraulic control system, similar to FIG. 1, incorporating the present invention and depicting yet another stage of operation.
Figure 4:
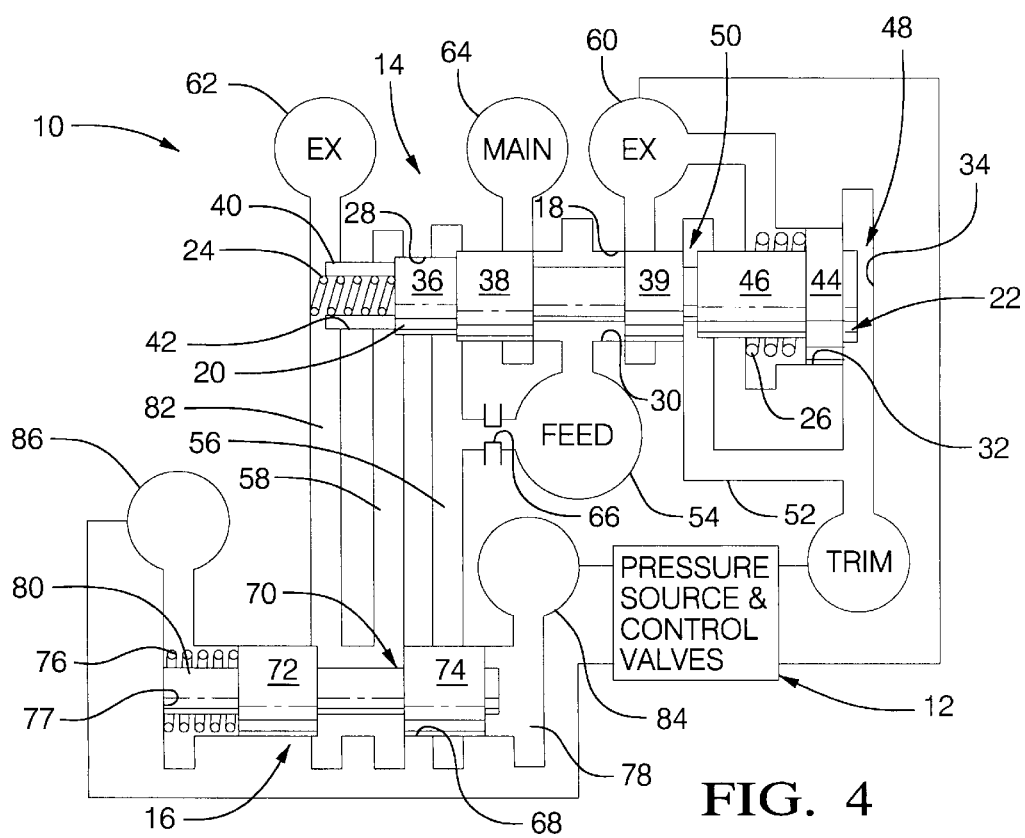
FIG. 4 is a diagrammatic and schematic representation of a portion of a hydraulic control system, similar to FIG. 1, incorporating the present invention and depicting still another stage of operation.

When the operator of the vehicle requires maximum acceleration or power at launch, a more aggressive friction device engagement is needed. With the present invention, this is accomplished with the introduction of bias control valve 16. The pressure source and control 12 provides a pressure to passage 84, thereby pressurizing chamber 78, and also the passage 86 and chamber 80 are connected to exhaust. The valve spool 70 is moved leftward against the spring 76, as seen in FIGS. 3 and 4. This results in the land 74 closing the feedback passage at valve 16 and opening the feedback passage 58 to exhaust between lands 72 and 74. Accordingly, only area A2 of the valve spool is being pressurized by the feedback pressure.

As seen in FIG. 5, the feed pressure will rise more rapidly along curve 96 until point 98 at line 92 is reached. The pressure rise subsequent to point 98 will be more rapid along curve 99. In equation form the feed pressure function represented by curve 96 is: TP*A3=FP*A2+S. Since the ratio of area A3 to area A2 is 2.0, the feed pressure rises twice as fast as the trim pressure. The feed pressure function of curve 99 is represented in equation form as: TP*A4=FP*A2+S. Since the ratio of area A4 to area A2 is 4.1, the feed pressure increases 4.1 times faster than the trim pressure.

This permits rapid engagement of the friction device with limited controlled slippage of the friction plates. The area A4 and the spring 26 effect the line 92. By changing either or both of these design factors the "knee" of the curves 88–94 and 96–99 can be positioned as desired for any given transmission.

A curve 100 shown in FIG. 5 represents a 3.0 to 1.0 ratio between the feed pressure and the trim pressure. This is a commonly used factor in many heavy duty transmissions, such as those used in hauling type vehicles. It will be appreciated by those familiar with these types of transmissions that the present invention will provide the same maximum feed pressure at a schedule that permits improved shift quality both at high torque requirements and at normal operation. At normal operating conditions, the feed pressure to the friction devices is lower which will permit lower system pressure and therefore improved overall efficiency.

We claim:

1. A control valve apparatus comprising:

a pressure regulator valve having a valve spool with first and second pressure responsive areas and a first pressure control area and a first bias spring;

a plug valve adjacent to and axially aligned with said valve spool and having a second pressure control area and a second bias spring;

means for supplying a main pressure fluid to said valve spool;

means for delivering a feed pressure fluid from said valve spool including means for distributing said feed pressure fluid to said first and second pressure responsive areas;

means for supplying a control fluid pressure to said first and second pressure control areas; and said feed pressure being controlled at a first ratio relative to said control pressure when said control pressure is below a predetermined level and at another ratio relative to said control pressure when said control pressure is above said predetermined level.

2. The control valve apparatus defined in claim 1 further comprising:

a control valve disposed in said second means for selectively discontinuing feed pressure distribution to one of said first and second pressure responsive areas.

3. A control valve apparatus comprising:

a regulator valve having a valve spool slidably disposed in a stepped diameter valve bore, said valve spool having a first diameter land disposed in a first bore diameter, a second diameter land disposed in a second bore diameter and providing a first differential area relative to said first land and third and fourth equal diameter spaced lands disposed in a third bore diameter, said third diameter land providing a second differential area relative to said second diameter land, said fourth diameter land having an end area larger than the sum of said first and second differential areas;

a spring biasing said valve spool in one direction;

a plug valve slidably disposed in said stepped diameter valve bore adjacent said valve spool having a first diameter disposed in said third bore diameter, a second diameter land disposed in a fourth bore diameter and a spring biasing said plug valve away from said valve spool, said plug valve second diameter land having an end area greater than the end area of a fourth diameter land;

a source of fluid pressure for supplying control pressure fluid to said end areas of said valve spool and said plug valve, and main pressure fluid to said valve spool;

said regulator valve being effective to deliver a controlled feed pressure fluid from said main pressure fluid in response to control pressure fluid acting on said end area of said fourth diameter land and said controlled feed pressure fluid acting on said first and second differential areas when said control pressure fluid is below a predetermined pressure level and in response to control pressure fluid acting on said plug valve second diameter land and said controlled feed pressure fluid acting on said first and second differential areas when said control pressure fluid is greater than said predetermined pressure level.

4. The control valve apparatus defined in claim 3 further comprising:

a control valve having a valve spool slidably disposed in a valve bore, a bias spring urging said valve spool in one direction in said valve bore;

a control chamber adjacent one end of said valve spool, said source of fluid pressure selectively supplying a second control pressure fluid to said control chamber, said control valve being effective when positioned by said spring to direct said controlled feed pressure to one said differential areas and to block controlled feed pressure fluid to said one differential area when said control valve is positioned by pressure in said control chamber.

* * * * *